United States Patent
Sacco

(10) Patent No.: US 8,959,090 B1
(45) Date of Patent: *Feb. 17, 2015

(54) PROCESS FOR PHYSICAL DATABASE DESIGN BASED ON TRANSACTION WORKLOAD

(71) Applicant: Giovanni Sacco, Turin (IT)

(72) Inventor: Giovanni Sacco, Turin (IT)

( * ) Notice: Subject to any disclaimer, the term of this patent is extended or adjusted under 35 U.S.C. 154(b) by 0 days.

This patent is subject to a terminal disclaimer.

(21) Appl. No.: 14/035,698

(22) Filed: Sep. 24, 2013

Related U.S. Application Data

(63) Continuation of application No. 12/879,819, filed on Sep. 10, 2010, now Pat. No. 8,566,318.

(51) Int. Cl.
 *G06F 17/30* (2006.01)

(52) U.S. Cl.
 CPC .... *G06F 17/30292* (2013.01); *G06F 17/30581* (2013.01)
 USPC .......................................... 707/737

(58) Field of Classification Search
 USPC ................. 707/737, 615, 969, 970; 718/103
 See application file for complete search history.

(56) References Cited

U.S. PATENT DOCUMENTS

| | | | | |
|---|---|---|---|---|
| 5,404,510 A * | 4/1995 | Smith et al. ........................ | 1/1 |
| 5,485,610 A | 1/1996 | Gioielli et al. ................... | 1/1 |
| 5,918,225 A | 6/1999 | White et al. ..................... | 1/1 |
| 6,341,289 B1 * | 1/2002 | Burroughs et al. ............ | 707/737 |
| 6,496,850 B1 * | 12/2002 | Bowman-Amuah .......... | 709/203 |
| 6,529,909 B1 * | 3/2003 | Bowman-Amuah ............. | 1/1 |
| 6,571,282 B1 * | 5/2003 | Bowman-Amuah .......... | 709/219 |
| 6,640,238 B1 * | 10/2003 | Bowman-Amuah .......... | 709/201 |
| 6,728,694 B1 * | 4/2004 | Ramasamy et al. .......... | 707/714 |
| 6,742,015 B1 | 5/2004 | Bowman-Amuah .......... | 718/101 |
| 6,920,460 B1 * | 7/2005 | Srinivasan et al. ................ | 1/1 |
| 7,181,438 B1 | 2/2007 | Szabo ............................. | 1/1 |
| 7,249,118 B2 | 7/2007 | Sandler et al. .................. | 1/1 |
| 7,366,716 B2 * | 4/2008 | Agrawal et al. ................ | 1/1 |
| 7,580,941 B2 * | 8/2009 | Narasayya et al. ............. | 1/1 |
| 7,617,235 B2 * | 11/2009 | Srinivasan et al. ............. | 1/1 |
| 7,647,298 B2 | 1/2010 | Adya et al. ............. | 707/999.002 |
| 7,680,767 B2 | 3/2010 | Adya et al. ............. | 707/999.002 |
| 7,801,896 B2 | 9/2010 | Szabo ............................. | 707/739 |
| 8,126,905 B2 * | 2/2012 | Xu et al. ........................ | 707/764 |
| 8,156,107 B2 * | 4/2012 | Bawa et al. .................... | 707/713 |
| 8,229,952 B2 | 7/2012 | Cras et al. ..................... | 707/769 |
| 8,290,931 B2 * | 10/2012 | Hong et al. .................... | 707/713 |
| 8,301,593 B2 | 10/2012 | Hoffmann et al. ............. | 707/615 |
| 8,346,929 B1 | 1/2013 | Lai ................................. | 709/226 |
| 8,566,318 B1 * | 10/2013 | Sacco ............................. | 707/737 |
| 8,572,091 B1 * | 10/2013 | Sivasubramanian et al. . | 707/747 |
| 8,671,091 B2 * | 3/2014 | Cherniack et al. ............. | 707/714 |
| 2007/0226196 A1 | 9/2007 | Adya et al. ....................... | 707/3 |
| 2007/0226203 A1 | 9/2007 | Adya et al. ....................... | 707/4 |
| 2008/0040348 A1 * | 2/2008 | Lawande et al. ................. | 707/7 |
| 2008/0189239 A1 | 8/2008 | Bawa et al. ....................... | 707/2 |
| 2008/0301168 A1 * | 12/2008 | Adler et al. .................... | 707/102 |
| 2009/0018996 A1 | 1/2009 | Hunt et al. ........................ | 707/2 |
| 2009/0089313 A1 | 4/2009 | Cooper et al. ................. | 707/102 |
| 2010/0082600 A1 * | 4/2010 | Xu et al. ........................ | 707/714 |
| 2010/0287185 A1 | 11/2010 | Cras et al. ..................... | 707/769 |
| 2012/0310917 A1 * | 12/2012 | Sheinin et al. ................ | 707/714 |
| 2013/0151491 A1 * | 6/2013 | Gislason ....................... | 707/696 |
| 2013/0262423 A1 * | 10/2013 | Graefe et al. ................. | 707/703 |

OTHER PUBLICATIONS

Jun Rao et al., Automating Physical Database Design in a Parallel Database, IBM Almaden research center, 1994.

Weilin Lu, Physical Database Design for Online Transaction Processing (OLTP) environments, 2008.

S. Navathe et al., "Vertical Partitioning Algorithms for Database Design," ACM Trans. Data Syst., Dec. 9, 4, 1984, pp. 680-710.

* cited by examiner

*Primary Examiner* — Jean M Corrielus
(74) *Attorney, Agent, or Firm* — Clifford Kraft

(57) ABSTRACT

A process is disclosed for using the computer for physical database design, which is based on transaction workload, and minimizes the cost of retrieval and modification for a set of transactions on a database.

5 Claims, No Drawings

PROCESS FOR PHYSICAL DATABASE DESIGN BASED ON TRANSACTION WORKLOAD

This is a continuation of application Ser. No. 12/879,819 filed Sep. 10, 2010. Application Ser. No. 12/879,819 is hereby incorporated by reference in its entirety.

PRIOR ART

Navathe, S., Ceri, S., Wiederhold, G., and Dou, J. 1984. Vertical partitioning algorithms for database design. ACM Trans. Database Syst. 9, 4 (December 1984), 680-710

BACKGROUND OF THE INVENTION

Record-oriented architectures have long been a tenet of data processing. Record structures are found in programming languages and in databases alike: data fields that are logically related are physically stored in the same record. The physical database is composed of a set of files, each file usually containing records of the same type.

The design of a database schema, which represents the logical level, is usually performed through the mapping of a conceptual schema (such as an Entity-Relationship schema) to a logical schema (e.g. a relational schema). In some models, and notably in relational models, files composed by records, which are in turn composed of data fields, are visible at the logical level, which is the level at which transactions on the database operate. Any change to the logical schema requires the modification of the transactions that operate on the portion of the logical schema that was modified.

The logical level is independent of transactions and describes only data and their relationships with no concern for performance. The physical level, instead, is dependent on the actual use of the database and hence on the transactions run on the database, their frequency of execution, their priority, etc. It is obviously desirable, and in fact a much stressed advantage of relational database systems, that the logical and physical levels be independent, so that tuning the physical level in order to improve performance does not require any changes to the transactions defined on the database.

We will use the term data clustering to denote the organization of data fields into records, and consequently in files. Data clustering has extremely relevant, if overlooked, consequences on performance when record structures are used to store data in secondary memory. In fact, the record size determines the access cost either directly, in the case of sequential or index-sequential scans, or indirectly, as a parameter that influences index height, for index structures.

Clustering of data into records is indeed a physical design choice, and different but logically equivalent clustering strategies produce different access costs. As an example consider that current logical design practices, such as mapping conceptual E-R schemata into relational schemata, encourage the creation of jumbo relations to represent entities: all single-valued attributes of an entity are stored in the same relation. Most transactions on the database only need a fraction of the attributes stored in such relations, but have to access the entire record anyway and as a consequence pay a potentially high overhead caused by useless data.

The best (i.e. less expensive in terms of computer resources) clustering scheme for a relation depends on the actual transactions run on the database, their frequency and their criticality. Therefore, data clustering is a decision to be taken at the physical level, rather than at the logical level as it currently happens.

SUMMARY OF THE INVENTION

Embodiments describe a process that uses a computer to cluster data of a database among different files, through partitioning, replication and encoding, in order to minimize the weighted access cost for a set of transactions (possibly including all the transactions on the database) described by several parameters, among which their frequency of use, and of a process that uses a computer to provide a separation of the physical level where clustering is performed from the logical level where transactions are defined, so that any change in clustering at the physical level is transparent to the logical level and consequently logical-level transactions do not require any modification as a result of changes at the physical level.

DESCRIPTION OF PREFERRED EMBODIMENTS

All the methods and the operations described here are performed on a computer. Although we explicitly refer to relational database systems, the invention described here can be easily applied to other data models including, among others, objected-oriented and object-relational data models.

In this context, a number of problems must be solved. First, strategies for efficient clustering need to be derived. Second, a framework for physical clustering tuning must be defined. Finally, most data models, including the relational data model, are unable to insure the separation of the logical from the physical level, as far as clustering is concerned: any change to the clustering scheme has an immediate impact on the logical schema and, hence, on the transactions defined on the database. This would dramatically limit the applicability of clustering. Based on this, a computer architecture that decouples the logical schema, as perceived by transactions, from the physical schema which describes actual record structures, could have certain advantages.

In order to derive efficient clustering strategies, we propose a general "optimality" principle for physical data clustering, the locality principle:—all and only the data that are accessed together must be physically stored together.

If we consider each query in isolation, this principle is obviously true, since it states that the optimal storage scheme for a query is one in which the result is precomputed (we ignore here derived attributes such as sum, average, etc.). According to the locality principle, the best physical schema for query Q is a single relation that contains all and only the attributes referenced in Q and all and only the tuples that satisfy all the selections in Q. This schema can be produced by the following storage strategies (in the following, the terms subrelation and partition are used as synonyms of a physical file, i.e. a physical storage structure holding records):

Vertical partitioning of relations: each relation R that is referenced in Q is partitioned into two subrelations R1 and R2, where R1 contains all the attributes of R referenced by Q, and R2 the remaining attributes. The primary key of R is replicated in both relations. If a synthetic record identifier is used, such identifier is replicated in both relations, but the primary key need not be.

Horizontal partitioning of relations: the tuples of each relation R, referenced in Q and for which a selection S exists in Q, are partitioned into a subrelation R1, containing all the tuples in R satisfying Q, and into a subrelation R2, containing all the other tuples from R;

Denormalization: if Q is on two or more relations, all the attributes referenced in Q for all relations are stored in a single relation R.

While partitioning schemes never increase the overall size of the relation being partitioned (apart from key replication in vertical partitioning), denormalization has two undesirable consequences. First, it introduces update anomalies. Second, it can dramatically increase the size of the resulting relation, especially if one or more of the relations referenced in Q represent M:N relationships.

If we consider the entire transaction workload on a database, we need to consider update operations and several queries on the database. In particular, we can have several different single-relation queries referencing a single relation R. Each of these queries will reference a different set of attributes in R, and in general the set of attributes for two different queries may overlap. The only way of implementing vertical partitioning in this case is by redundancy. That is, we can build, for each query Qi, a sub-relation Ri of R which contains all the attributes referenced in Qi (we ignore the costs of updates for the moment being). Since attribute sets for different queries may overlap, an attribute may be stored in more than one sub-relation.

It turns out that redundancy can also be used to implement the same physical performance effect of denormalization without introducing update anomalies. The idea is to replicate rather than transferring the attributes of one relation in another relation. As an example, consider the classical EMPLOYEE, DEPARTMENT schema:

EMPLOYEE(EID, ENAME, ADDRESS, . . . , DID)
DEPARTMENT(DID, DNAME, . . . )
and a query Q:
SELECT ENAME, DNAME
FROM EMPLOYEE, DEPARTMENT
WHERE EMPLOYEE.DID=DEPARTMENT.DID Instead of denormalizing and hence creating a single relation, we can keep the two relations, but add a copy of DNAME to EMPLOYEE. The resulting schema:

EMPLOYEE(EID, ENAME, ADDRESS, . . . , DID, DNAME)
DEPARTMENT(DID, DNAME, . . . )

reduce update anomalies: for instance, we can insert a new instance of DEPARTMENT even though no instance of EMPLOYEE works in it. Obviously, the two copies of DNAME must be kept synchronized. The query Q can be translated into:

SELECT ENAME, DNAME
FROM EMPLOYEE which does not require a join and is generally faster than the original query.

In summary, we will primarily consider the following strategies for physical design, in addition to common strategies such as the definition of index structures for quick access:

Vertical partitioning. An extended version of partitioning is used, in which a relation can be partitioned into several sub-relations, each storing one or more attributes.

Attribute replication, both intra and inter-relation replication. Intra-relation replication allows an attribute of a relation to be stored in several subrelations, so that vertical partitioning can be overlapping. Inter-relation replication creates, in a file, copies of values stored in different relations.

Additional strategies that can be considered are:

Horizontal partitioning Multivalued selection criteria can be use to partition R into more than two subrelations. In the case in which a partition is uniquely identified by a specific value of one or more attributes, these attributes do not need to be explicitly represented in the partition, thereby saving space and often avoiding the need of defining an index to access the records in the partition. Horizontal partitioning is more complex than vertical partitioning because most selections are really parametric selections based on user-supplied values. In these cases, a static partitioning is impossible. Additionally, the system must consider all the horizontal fragments of a relation in order to guarantee primary and candidate key uniqueness;

Encoding. Encoding is the representation of the values of one or more attributes by system-generated codes, which refer to an external lookup table. As an example, the values of attribute "City" in a relation R, can be encoded by an integer that is the primary key to a relation "CityNames", which contains the actual values. Attributes with the same underlying domain can share the same lookup table. Encoding is apparently in conflict with the locality principle introduced above, because it introduces an external (lookup) relation. However, the use of an external relation can be advantageous when the lookup table is sufficiently small to be kept in memory and the attribute has large alphanumeric values. As an example, the number of Italian communes is 8092, which can be encoded in two bytes, with a lookup table of a few hundred kilobytes, whereas each name is considerably longer. Thus, the size of data to be accessed is reduced with no execution overhead, because decoding is done in main memory.

The physical design phase is performed on a set of transactions. This set usually includes only the "important" transactions (e.g., frequent or critical transactions). The goal of physical design is to minimize a cost function which is a weighted function of parameters such as throughput, response time, transaction frequency and priority. A number of techniques can be used to find an optimal or approximate solution to the problem (e.g., the A* algorithm, Nilsson, N.J., Principles of artificial intelligence, Tioga Publishing Company, Palo Alto, Calif., 1980). Optimized physical design can be performed when the database administrator requires it. Alternatively, system usage and performance can be monitored and physical design performed automatically or a request for it issued, when redesign would prove beneficial. The cost of transforming the current physical schema into the new one (which involves copying data from one schema to the other one) must be accounted for in the overall costs. It must be stressed that the files produced by physical design need not reside on the same machine, but can be distributed over a network, for example over clusters of processors or geographically different sites.

As mentioned above, all the modifications performed by physical design should transparent to the logical level, otherwise transactions will have to be modified. Unfortunately, relational systems (and most systems based on different models) consider clustering as a logical rather than a physical feature and therefore do not support the required transparency. Therefore, an additional layer between the logical schema, as perceived by users and transactions, and the physical schema, which may have a different clustering, is required. It is beneficial that the logical schema can be derived directly from the conceptual schema, and it needs not account for transaction workload. It is a requirement that the logical schema does not change as a result of actions at the physical level.

The intermediate layer between logical and physical schemata is responsible for mapping the logical schema (relations and attributes) to the physical schema, for managing the partitioning and replication of attributes and for encoding management. The intermediate layer maintains persistent internal data structures that enable the system to map a transaction defined on the logical schema (logical transaction) into a usually different, but equivalent, transaction defined on the physical schema (physical transaction). Such mapping can produce a physical transaction written in the same language as the logical transaction, or a physical transaction defined in terms of the database system internal operations. The first type of mapping is useful when the intermediate level is implemented as a front-end to an existing database system. The second type of mapping is generally used when the intermediate level is implemented directly by the database system.

The persistent data structures that are maintained in the computer include structures that map between logical relations and the physical files resulting from vertical and/or horizontal partitioning. Additional data structures are maintained in order to account for attribute replication and encoding. These structures are used to map all logical transactions into physical transactions. Since the physical schema differs from the logical schema because it improves the performance of a set of transactions, the internal data structures may contain hints for the system query optimizer for these transactions.

In the mapping of logical transactions to physical transactions, special attention must be given to attribute replication and encoding in the context of transactions that modify the database and, specifically, replicated or encoded attributes. For attribute replication, one of the copies of the attribute is considered as the master copy. For attribute replication among different partitions of the same logical relation, an arbitrary copy of the attribute can be considered as the master copy.

For attribute replication across different logical relations as in the example above, the master copy is the original attribute or, more precisely, the copy in the file containing the original attribute. Thus, in the example above, the master copy for DNAME is the attribute DNAME in one of the partitions of DEPARTMENT. All the other copies depend on this copy and on the value of one or more attributes for their value. Since attribute replication is generally used to avoid joins, the replicated attribute will be directly or indirectly dependent on foreign-key attributes, and we will call these attributes foreign attributes. In the example above, DNAME in EMPLOYEE depends on the value of DEPARTMENT.DNAME and on the value of the foreign attribute EMPLOYEE.DID.

Whenever any of the attributes (master copy or foreign attributes) on which it is dependent change value, the corresponding value of EMPLOYEE.DNAME must change. Thus, when a logical transaction changes the value of the DNAME of the DEPARTMENT whose DID is 5 to the value "Sales", the corresponding physical transaction must change the value of the master copy of DNAME, and in addition, it must synchronize all its copies. Hence the value of EMPLOYEE.DNAME for each tuple of EMPLOYEE where EMPLOYEE.DID=5 must be set to "Sales". The query that locates the appropriate value can easily be derived during physical design. The deletion of a master copy value, which occurs when its tuple is deleted, can be usually managed in system that do not guarantee referential integrity by setting the values of all the copies to a null value. Thus, if the DEPARTMENT with DID=5 is deleted, the value of EMPLOYEE.DNAME for each tuple of EMPLOYEE where EMPLOYEE.DID=5 is set to NULL.

Another case occurs when a logical transaction changes the value of the foreign attributes on which a copy is dependent. In this case, the master copy does not change but the local copy must be updated. In the example above this occurs when the value of DID for a tuple t of EMPLOYEE is changed to X. In this case, t.DNAME must be set to the value of DEPARTMENT.DNAME where DEPARTMENT.DID=X. Dependency from foreign attributes may be indirect, i.e. an attribute A is dependent on B who is in turn dependent on C and so on.

As an example, consider the following logical schema fragment

EMPLOYEE(EID, ENAME, ADDRESS, . . . , DID)
DEPARTMENT(DID, DNAME, . . . , MGRID)

where MGRID is the id of the department manager, who is an instance of EMPLOYEE, and the corresponding physical schema EMPLOYEE(EID, ENAME, ADDRESS, . . . , DID, DNAME, MGRNAME)
DEPARTMENT(DID, DNAME, . . . , MGRID)

where the name of the manager of the department of the employee is replicated in the EMPLOYEE relation. MGRNAME depends on the foreign attributes EMPLOYEE.DID and DEPARTMENT.MGRID. Thus, if any of these attributes changes, the dependent value MGRNAME must change.

In order to efficiently perform updates on foreign attributes, it is advantageous to keep a list of replicated attributes for each attribute on which a replicated attribute is dependent. In the example above, the list for EMPLOYEE.DID contains EMPLOYEE.DNAME (and the query to retrieve it given a specific value of EMPLOYEE.DID) and EMPLOYEE.MGRNAME (and its query), whereas the list for DEPARTMENT.MGRID only contains EMPLOYEE.MGRNAME and its query. On a change of the value of DID in a tuple t of EMPLOYEE, for instance, the list corresponding to EMPLOYEE.DID will be scanned and EMPLOYEE.DNAME and EMPLOYEE.MGRNAME updated.

For encoded attributes, the physical transactions can provide data coherence by inserting and deleting values from lookup tables. The insertion of a new value also requires the creation of a new code for the inserted value.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other physical design for other data models can be carried out in this way.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

Also, the inventor intends that only those claims which use the words "means for" are intended to be interpreted under 35 USC 112, sixth paragraph. Moreover, no limitations from the specification are intended to be read into any claims, unless those limitations are expressly included in the claims. The computer described herein may be any kind of computer, either general purpose, or some specific purpose computer such as a workstation, or any organization of computers interconnected by whatever means and locally or geographically distributed. The computer may also be a server or a server farm implementing a website. The computer may be programmed by any programming language. Secondary storage defines generic storage devices (including main memory) that maintain information that the computer can access, and may use any type of technology for this purpose.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

I claim:

1. A method of using a computer system for physical database design, said method synthesizing a physical schema for a relational or object-relational logical schema in a database, said synthesized physical schema is obtained by creating files and assigning attributes to said files, said method also including:
   a) vertical partitioning, said vertical partitioning allocating attributes of a single relation to two or more subrelations, each represented by a file, said attribute allocation allowing a replication of one or more attributes;
   b) attribute replication, said replication involving attributes of a same relation replicated in different partitions of said relation, or attributes belonging to different relations;
   c) horizontal partitioning, said horizontal partitioning allocating the records of a single relation to two or more subrelations, each represented by a file, according to a criterion based on a value of one or more attributes of said relation; and
   d) encoding of one or more attributes of a relation, said encoding representing values of said attributes by system-generated codes, and using an external lookup table including said system-generated codes and said values to find the value corresponding to a specific system-generated code, where said system-generated codes are primary keys of said lookup table, said lookup table is shared by attributes with a same underlying domain.

2. The method of claim 1, said method further providing data allocation transparency in a database system; and using the computer system to translate a transaction from a logical level to the appropriate files and attributes at the synthesized physical level.

3. The method of claim 2, said method further providing replicated data coherence by updating all copies of replicated data upon modification of said data.

4. The method of claim 2, said method further providing data coherence for encoded attributes by inserting and deleting values from lookup tables, said insertion also creating a new code for the inserted value.

5. The method of claim 1 wherein said computer system is used to synthesize a physical schema that minimizes the access cost for a set of transactions, said access cost being a weighted combination of parameters including response time, throughput, and transaction priority.

\* \* \* \* \*